June 16, 1925.
C. L. CRAIG
STEERING DEVICE
Filed Aug. 9, 1922
1,542,436
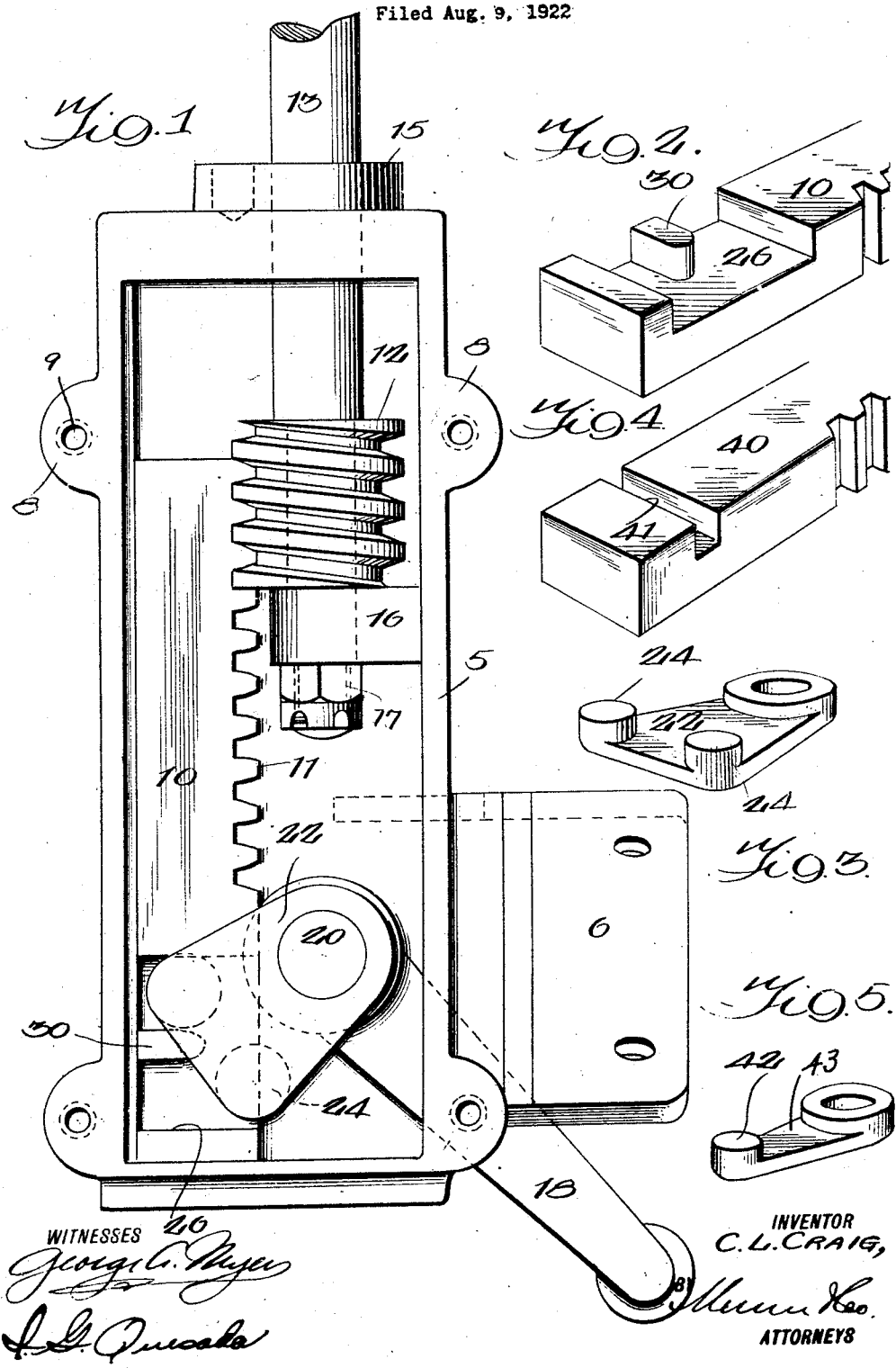
INVENTOR
C. L. CRAIG,
ATTORNEYS Patented June 16, 1925.

1,542,436

UNITED STATES PATENT OFFICE.

CLYDE L. CRAIG, OF WASHINGTON, OHIO.

STEERING DEVICE.

Application filed August 9, 1922. Serial No. 580,799.

*To all whom it may concern:*

Be it known that I, CLYDE L. CRAIG, a citizen of the United States, and a resident of Washington, county of Fayette and State of Ohio, have invented certain new and useful Improvements in Steering Devices, of which the following is a specification.

This invention relates to steering devices especially adapted for application to automobiles and the like.

Briefly stated, an important object of this invention is to provide a steering device embodying a rack having connection with the steering arm through the medium of spaced driving lugs which are so arranged that an efficient driving connection is maintained between the rack and the arm when the wheels are turned to their extreme positions.

A further object is to provide a steering mechanism wherein the strain incident to the engagement of the wheels with an inequality in the roadway will not be transmitted to the steering post and render steering difficult.

A further object is to provide a steering mechanism which is simple to apply, efficient to use, and cheap to manufacture.

Other objects and advantages will be apparent during the course of the following description.

In the accompanying drawing forming a part of this application and in which like numerals are employed to designate like parts throughout the same, Figure 1 is a plan view of the improved steering mechanism.

Figure 2 is a fragmentary perspective of the rack embodied in the invention.

Figure 3 is a perspective of the rack contact lugs and the supporting means therefor.

Figure 4 is a fragmentary perspective illustrating a slight modification of the invention.

Figure 5 is a perspective of a modified form of rack engaging member.

In the drawing, the numeral 5 designates a casing having a bracket 6 and attaching members of any suitable nature may be extended through the bracket for connecting the casing to the frame of the motor vehicle. A suitable cover is attached to the casing and for this purpose suitable ears 8 are formed along the edge of the casing and are provided with threaded openings 9 for the reception of fastening bolts. In carrying out the invention a rack 10 is slidable longitudinally within the casing and has one edge formed with teeth 11 engaged by a worm 12. The worm 12 is in turn connected to a steering post 13 which is illustrated in Figure 1 extends through a bearing or boss 15 in one end of the casing. It will be observed that the terminal portion of the steering post 13 is rotatably extended through a second bearing 16 arranged within the casing and a fastening device in the nature of a nut 17 is threaded on the end of the post beyond the bearing.

Of course, the steering post 13 is turned in the proper direction by the operator and this motion moves the rack 10 longitudinally.

The movement thus imparted to the rack 10 is transmitted to a steering arm 18 connected to the front wheels of the vehicle through the medium of the usual rods and links. In carrying out the invention, the steering arm 18 is rigidly mounted on a shaft 20 rotatably carried by the casing and a second arm 22 is also rigidly connected to the shaft and has its outer end flared as illustrated in Figure 1.

Attention is directed to the fact that the flared terminal portion of the arm 22 is provided with rack contact lugs 24 which are received in a substantially U-shaped groove or recess 26 in one terminal portion of the rack. As the rack is reciprocated, one end wall of the groove 26 will contact with the adjacent lug 24 and thereby rock the shaft 20 with the result that the front wheels will be turned. However, when the rack approaches the limit of its movement in one direction one of the lugs or more particularly that lug which previously had a driving engagement with the rack will move laterally of the rack and consequently out of operative relation thereto. At this point, the other lug comes into play as it is positioned approximately at the longitudinal center of the rack. By reason of this construction, an efficient driving connection is provided between the rack and the arm and friction is reduced to a minimum. The intermediate portion of the recess or groove 26 is formed with an upstanding lug 30 which terminates adjacent the longitudinal center of the rack and extends to one longitudinal edge of the same, and it will be observed that the lug 30 is at times engaged by the driving lugs 24.

Should the wheels of the vehicle encounter an inequality in the roadway and be subjected to a lateral strain, the rack cannot rotate the post or in any way transmit the strain to the steering wheel.

In the form of the invention illustrated in Figures 4 and 5, the rack is designated by the numeral 40 and is provided with a rather narrow transverse groove 41 for the reception of the lug 42 of the arm 43. In this connection, it will be observed that the longitudinal movement of the rack will rock the arm and thereby impart the desired movement to the steering mechanism.

The construction illustrated in Figures 4 and 5 is especially adapted for use on light automobiles and the arrangement is such that the strain on the arm 43 cannot be transmitted through the rack to the steering column.

The foregoing illustrates that this invention is capable of a wide variety of mechanical expressions and it is therefore understood that the form of the invention herewith shown and described is to be taken as a preferred example of the same, and that such minor changes in arrangement and construction of parts may be made as will remain within the spirit of the invention and the scope of what is claimed.

I claim:—

1. A steering mechanism comprising a longitudinally movable member having transverse recesses, an arm having laterally spaced substantially circular lugs received in said recesses, and movable across the longitudinally movable member in an arcuate path, each spaced lug being adapted to be engaged by the adjacent end wall of said recess and moved transversely of the longitudinally movable member, one of said spaced lugs at all times being at approximately the longitudinal center of the longitudinal movable member for the efficient transmission of the drive from the longitudinally movable member to said arm.

2. The construction set forth in claim 1, said recess being provided with an upstanding fixed lug arranged between and engaged by said laterally spaced lugs.

3. The construction set forth in claim 1, and a steering member actuated by said arm and being movable about a fixed axis.

4. A steering mechanism comprising a rack having a U-shaped recess, an arm having laterally projecting lugs arranged in said recess and adapted to engage the walls thereof, and a worm connected to said rack.

CLYDE L. CRAIG.